United States Patent [19]
Downey

[11] 3,954,692
[45] *May 4, 1976

[54] ADHESIVE COMPOSITION
[75] Inventor: Raymond E. Downey, Copley, Ohio
[73] Assignee: The Goodyear Tire & Rubber Company, Akron, Ohio
[ * ] Notice: The portion of the term of this patent subsequent to Apr. 29, 1992, has been disclaimed.
[22] Filed: Mar. 3, 1975
[21] Appl. No.: 554,357

Related U.S. Application Data
[60] Division of Ser. No. 503,228, Sept. 5, 1974, Pat. No. 3,880,953, which is a continuation of Ser. No. 430,341, Jan. 2, 1974, abandoned which is a continuation of Ser. No. 323,561, Jan. 15, 1973, abandoned, which is a continuation of Ser. No. 169,853, Aug. 6, 1971, abandoned, which is a continuation of Ser. No. 807,975, March 17, 1969, abandoned.

[52] U.S. Cl. ................... 260/33.6 AQ; 260/876 B; 260/888; 260/894; 428/355; 428/517; 428/518
[51] Int. Cl.² ................... C08F 19/08; C08K 5/01; C09J 7/04
[58] Field of Search ............... 260/876 B, 888, 894, 260/33.6 AQ

[56] References Cited
UNITED STATES PATENTS

| | | | |
|---|---|---|---|
| 3,239,478 | 3/1966 | Harlan | 260/876 B |
| 3,509,239 | 4/1970 | Tindall | 260/876 B |
| 3,577,398 | 5/1971 | Pace et al. | 260/85.3 R |
| 3,880,953 | 4/1975 | Downey | 260/876 B |

Primary Examiner—Donald E. Czaja
Assistant Examiner—H. H. Fletcher
Attorney, Agent, or Firm—F. W. Brunner; H. C. Young, Jr.

[57] ABSTRACT

An adhesive composition which comprises a mixture of
a. an unvulcanized elastomeric block copolymer having the general configuration A - B - A wherein each A is a nonelastomeric monovinyl aromatic hydrocarbon polymer block and B is an elastomeric conjugated diene polymer block, and
b. a compatible thermoplastic tackifying resin containing carbon-to-carbon unsaturation therein and derived from hydrocarbons selected from aliphatic and alicyclic hydrocarbons.

3 Claims, No Drawings

ADHESIVE COMPOSITION

This is a Divisional application of application Ser. No. 503,228 filed Sept. 5, 1974, now U.S. Pat. No. 3,880,953, which was a continuation of application Ser. No. 430,341 filed Jan. 2, 1974, now abandoned, which was a continuation of application Ser. No. 323,561 filed Jan. 15, 1973, now abandoned, which was a streamline continuation of application Ser. No. 169,853 filed Aug. 6, 1971, now abandoned, which was a streamline continuation of application Ser. No. 807,975 filed Mar. 17, 1969, now abandoned.

This invention relates to adhesive compositions and to methods for their preparation. While the invention is not restricted thereto, it has particular reference to pressure sensitive adhesives. It further relates to pressure sensitive tapes.

Various adhesives can advantageously be used as pressure sensitive, laminate and hot melt adhesives. Most are generally known for their ability to form bonded laminated articles and some are more particularly known as pressure sensitive adhesives and some as hot melt adhesives.

Pressure-sensitive adhesives and adhesive-coated masking tapes and the like are well known. These products commonly contain natural rubber and a thermoplastic tackifier resin compatible therewith. The adhesive, coated on a flexible backing to form a tape, is tacky at normal room temperatures and adheres instantly and tightly to surfaces against which it is pressed without requiring moistening or heating. It typically is required to have good shear strength and 180° peel strength in order to be commercially useful.

Heretofore, adhesive compositions have been prepared by mixing conjugated diene-monovinyl aromatic hydrocarbon block copolymers such as, for example, polystyrene-polyisoprene-polystyrene block polymers with tackifying resins containing aromatic substituents. However, for many applications such as pressure sensitive, laminating and hot melt adhesives, these adhesive compositions have insufficient tack to be commercially useful. In particular, pressure sensitive tapes prepared therefrom typically have had insufficient shear strength and 180° peel strength, critical physical properties for most commercial tapes.

Therefore, it is an object of this invention to provide adhesive compositions having improved adhesive properties and to provide a method for their preparation.

In accordance with this invention it has been found unexpectedly that an adhesive composition comprises a mixture of (a) an unvulcanized elastomeric block copolymer having the general configuration A - B - A wherein each A is an independently selected nonelastomeric monovinyl aromatic hydrocarbon polymer block having an average molecular weight of 2,000 to 100,000 and a glass transition temperature above about 25°C., the total block A content being from about 10 to about 50 percent by weight of the copolymer, and B is an elastomeric conjugated diene polymer block having an average molecular weight from about 25,000 to about 1,000,000 and a glass transition temperature below about 10°C., said copolymer having a tensile strength at 25°C. in excess of about 200 pounds per square inch, and (b) a compatible, thermoplastic tackifying resin containing carbon-to-carbon unsaturation therein and derived from hydrocarbons having from 5 to 8 carbon atoms and at least one carbon-to-carbon double bond therein selected from aliphatic hydrocarbons and alicyclic hydrocarbons.

In the unvulcanized elastomeric block copolymer, it is preferred that the nonelastomeric monovinyl aromatic hydrocarbon polymer block is a polymer of styrene having an average molecular weight of from about 5,000 to about 30,000, that the elastomeric conjugated diene polymer block is a 1,4-addition polymer of a conjugated diene selected from isoprene and 1,3-butadiene having an average molecular weight of from about 50,000 to about 150,000, and the total block A content is from about 10 to about 50 percent, more preferably from about 12 to about 30 percent by weight of the copolymer. It is especially preferred that the elastomeric conjugated diene polymer block is a 1,4-addition polymer of isoprene. The copolymer typically can have an intrinsic viscosity of from about 0.6 to about 1.5 as determined by 0.5 grams in 50 milliliters of toluene solution at 30°C.

In the practice of this invention the thermoplastic tackifying resins preferably have a softening point according to ASTM Method E28-58T of from about 50° to about 150°C. and more preferably from about 80° to about 130°C. They are derived from aliphatic and alicyclic hydrocarbons, preferably aliphatic hydrocarbons, and therefore contain essentially no units derived from aromatic hydrocarbons. In this regard it is preferred that not more than about 5 percent by weight of the units of the tackifying resin are derived from aromatic hydrocarbons and more preferably it is desired that none of the units are derived from aromatic hydrocarbons. Furthermore, it is preferred that the tackifying resin contains carbon-to-carbon unsaturation therein. Therefore, it is preferred that at least a portion of the hydrocarbons used to prepare the resin have at least two carbon-to-carbon double bonds therein. As an indication of such unsaturation contained in the tackifying resin, it has been found that satisfactory resins have an iodine number according to ASTM Method D1959-61 of from about 40 to about 150.

Various thermoplastic tackifying resins can be used in this invention such as, for example, resins derived by polymerizing unsaturated hydrocarbons obtained from petroleum fractions and processes related thereto. It is usually desired to copolymerize at least one unsaturated hydrocarbon having one double bond (monoolefin) with at least one unsaturated hydrocarbon having more than one double bond (diolefin). Various mole ratios of diolefins to monoolefins can be used such as from about 20:80 to about 80:20. Representative of various diolefins are aliphatic diolefins having from 4 to 8 and preferably from 4 to 6 carbon atoms, particularly the conjugated dienes such as 1,3-butadiene, 2-methyl-1,3-butadiene (isoprene), 2-ethyl-1,3-butadiene and 1,3-pentadiene (piperylene), and aliphatic cyclic diolefins such as cyclopentadiene and dicyclopentadiene. It is usually preferred that at least one of the double bonds is alpha to the first carbon atom. Representative of various monoolefins are aliphatic monoolefins having from 3 to 8, and preferably from 4 to 6, carbon atoms such as propylene, the various butenes, including 2-methyl-2-butene, the pentenes, the hexenes, the heptenes and the octenes, and cyclic aliphatic monoolefins having from 5 to 8 and preferably from 5 to 6 carbon atoms such as cyclopentene, cyclohexene, cycloheptene and cyclooctene.

The resins are generally prepared by polymerizing the unsaturated hydrocarbons in an inert volatile solvent or diluent in the presence of a suitable catalyst such as a Friedel-Krafts type catalyst, preferably selected from aluminum chloride, aluminum bromide, stannic chloride, boron trifluoride, boron trifluoride etherate and also alkyl aluminum halides such as isopropyl aluminum dichloride. Usually, for convenience, particulate anhydrous aluminum chloride is preferred.

In the preparation of the resins, a wide range of temperatures are suitable for the polymerizations. For example, the polymerizations can normally be carried out in the range of from about −20°C. to about 100°C. and usually more preferably from about 0°C. to about 50°C. but above the freezing point of the reaction system and below its boiling point. Certainly, whether the pressure at which the reaction is being conducted should be taken into consideration when determining the optimum temperature. Normally, the polymerization reaction pressures may be atmospheric or above or below atmospheric pressure. Generally, a satisfactory polymerization is conducted at about autogenous pressure developed under the operating conditions used.

Exemplary of a preferred thermoplastic tackifying resin for this invention comprises from about 20 to about 80 units derived from piperylene and correspondingly from about 80 to about 20 units derived from 2-methyl-2-butene. The tackifying resin typically has a softening point of from about 80° to about 110°C. The preparation of such a resin polymer is more fully described in U.S. Pat. application Ser. No. 556,293, filed June 9, 1966. Such a resin polymer can be prepared, for example, by polymerizing a mixture comprising from about 20 to about 75 weight percent of piperylene and from about 80 to about 25 weight percent of 2-methyl-2-butene in the presence of an anhydrous catalyst selected from aluminum chloride, aluminum bromide, stannic chloride, and boron trifluoride at a temperature of from about 0° to about 50°C. It is usually preferred to conduct the polymerization in an inert volatile organic solvent using aluminum chloride having a mesh size of from about 50 to about 200 U.S. Sieve size as the catalyst. The resin polymers can be modified by containing up to about 25 percent by weight units derived from piperylene dimers, piperylene trimers, and other unsaturated hydrocarbons containing from 4 to 6 carbon atoms such as butene and substituted butenes such as 2-methyl-1-butene, 2,3-di-methyl-1-butene, 2,3-dimethyl-2-butene, 3,3-dimethyl-1-butene; the pentenes and substituted pentenes such as 1-pentene, 2-pentene, 2-methyl-1-pentene, 2-methyl-2-pentene, 3-methyl-2-pentene, 4-methyl-1-pentene; 4-methyl-2-pentene, the hexenes such as 2-hexene, diolefins such as isoprene, and cyclic unsaturated hydrocarbons such as cyclopentene, cyclohexene and 1,3-cyclopentadiene.

The unvulcanized elastomeric block copolymer used in this invention comprises nonelastomeric terminal polymer blocks and internal elastomeric polymer blocks. The characteristics of the internal or middle block, which is elastomeric, may be that expressed in ASTM Special Technical Bulletin No. 184 as follows: "A substance that can be stretched at room temperature to at least twice its original length and, after having been stretched and the stress removed, returns with force to approximately its original length in a short time."

The terminal nonelastomeric blocks constitute polymeric blocks which do not meet this definition. Furthermore, the difference between glass transition temperatures of the end blocks and middle blocks should be at least 40°C. and preferably at least 100°C.

Typically, the unvulcanized elastomeric copolymers can be prepared by first polymerizing olefins such as ethylene, propylene, styrene, polymethyl styrene, methyl styrene, acrylonitrile, chlorostyrene and methyl methacrylate with a lithium based initiator. A suitable lithium based initiator is, for example, lithium metal, alkyl lithium compounds, lithium hydrocarbyls and organo lithium amides. The alkyl lithium compounds are preferred. Particularly preferred alkyl lithium compounds are branched chain, preferably secondary alkyl lithiums. Such alkyl lithium compounds especially include secondary butyl lithium, isobutyl lithium, isoamyl lithium and secondary amyl lithium.

After polymerizing this monomer to an average molecular weight of from about 2,000 to about 100,000, and preferably from about 5,000 to about 30,000, a conjugated diene and additional amounts of the first monomer are added to the polymerization mixture. Preferred conjugated dienes are aliphatic conjugated dienes such as isoprene, methyl isoprene, butadiene, copolymers of the styrene-butadiene type and butadiene-acrylonitrile.

The polymerization then continues to provide an elastomeric middle block polymer of the conjugated diene having an average molecular weight of from about 25,000 to about 1,000,000, and more preferably between about 50,000 and about 500,000, followed by a non-elastomeric block polymer of the original type of monomer.

Typically, the preparation of the elastomeric block copolymer is made by polymerizing the monomers at temperatures in the order of about −20°C. to about 100°C., preferably between about 20°C. and about 65°C. in an inert hydrocarbon solvent such as an alpha olefin or aromatic hydrocarbon. Typically inert hydrocarbon solvents are aliphatic hydrocarbons (including cycloaliphatic) such as cyclohexane and a typical aromatic hydrocarbon is benzene. Usually the amount of initiator should be maintained as low as possible, but may be varied over a relatively wide range such as from about 1 to about 200 parts per million, based on the weight of the monomers present.

In the practice of this invention adhesive compositions are prepared by mixing the elastomeric block copolymer with the tackifying resins in the presence of volatile organic hydrocarbon solvents at various temperatures such as from about 0°C. to about 100°C. and typically from about 20°C. to about 60°C. but above the freezing point of the mixture and below its boiling point. Various aliphatic and aromatic hydrocarbons can be used. Representative examples of such aromatic hydrocarbons are toluene and benzene and representative examples of aliphatic hydrocarbons are pentane, hexane, heptane and octane. A particularly suitable hydrocarbon solvent is a mixture containing from about 10 to about 90 parts of toluene and correspondingly from about 90 to about 10 parts of hexane. This adhesive mixture is then suitable for bonding substrates such as by simply applying it to the substrate surfaces, partially drying it, and contacting the said substrate surfaces with the adhesive mixture therebetween and drying the said adhesive.

The mixture has particular utility as a pressure sensitive adhesive. For example, pressure sensitive tapes can easily be prepared by applying the solution of the adhesive mixture to a flexible substrate and drying the mixture. The adhesive of this invention also has utility as a hot melt pressure sensitive adhesive, particularly when prepared by mixing the elastomeric block copolymer, the hydrocarbon tackifying resin and a minor amount of an oil such as a petroleum derived or coal tar derived oil. Particularly suitable is mineral oil. The hot melt adhesive is simply applied by heating the mixture, applying it to a substrate and cooling. After cooling it is surprisingly found that the adhesive has good pressure sensitive properties.

In the preparation of the adhesives of this invention it is understood that minor amounts of various antioxidants and fillers can be added and mixed therewith in order to further improve its aging characteristics and various physical properties.

The following examples further illustrate the invention and are not intended to be limiting. In these examples the parts and percentages are by weight unless otherwise indicated.

EXAMPLE I

A thermoplastic tackifying resin was prepared by the following method:

To a reactor was charged 200 parts of heptane and 6 parts of anhydrous aluminum chloride at a temperature of about 25°C. While continuously stirring the mixture, 400 parts of a hydrocarbon mixture containing unsaturated hydrocarbons was slowly added to the reactor over a period of about 90 minutes. The temperature of the reaction was thereafter maintained in a range of about 25° to about 30°C. for about 60 minutes. The hydrocarbon mixture had the following composition:

| Component | Percent |
|---|---|
| 2-pentene | 5.1 |
| 2-methyl-2-butene | 32.9 |
| Isoprene | 3.1 |
| 1,3-pentadiene (piperylene) | 27.5 |
| 2,3-dimethyl-1-butene | 2.1 |
| 4-methyl-2-pentene | 19.4 |
| Unsaturated hydrocarbons containing 5 to 6 carbon atoms | 10.5 |
| | 100.6 |

After this polymerization, 25 parts of water, 8 parts of particulate hydrated calcium hydroxide and 8 parts of Attapulgus clay were added to the polymerizate. Agitation was provided to suspend the hydrated calcium hydroxide at about 90°C. and continued for about 120 minutes. The mixture was then filtered to remove the insoluble catalyst residue, excess calcium compound and clay. The filtrate was then steam distilled to a pot temperature of about 235°C. The resulting residual molten resin was poured from the reactor onto an aluminum tray and cooled to about 25°C. to form 173 parts of a hard brittle resin having a pale yellow color, and having a softening point, according to ASTM Method E28-58T of 94°C.

EXAMPLE II

A polystyrene-polyisoprene-polystyrene unvulcanized elastomeric block copolymer was prepared by the following method:

A solution was prepared consisting of 2 grams of styrene in a 20 milliliter solution of benzene. The solution was run through silica gel at about 25°C. to remove trace amounts of water and then sparged with dry nitrogen for about 30 seconds to remove trace amounts of air.

To the solution was added 0.2 millimoles of secondary butyl lithium in a 0.3 molar heptane solution. The mixture was allowed to polymerize and set aside for about 16 to 18 hours at about 25°C.

A solution was prepared consisting of 16 grams of isoprene and 2 grams of styrene in 80 milliliters of a benzene solution. The solution was run through silica gel at about 25°C. to remove traces of water and sparged with dry nitrogen to remove trace amounts of air.

The mixture of isoprene, styrene and benzene was mixed with the original polymerized styrene mixture to the exclusion of air in a reactor. The reactor was sealed and placed in a heated liquid polymerization bath at about 50°C. for about 4 hours until about a 100 percent completion of the polymerization occurred.

The resulting polymer was coagulated with methyl alcohol containing a very small amount of a phenolic antioxidant and dried. The resulting polymer had an intrinsic viscosity of 1.12 in toluene at 30°C. It contained 18 percent by weight units derived from styrene.

A portion of the polymer was molded in the form of dumbbells at 138°C. The dumbbells had a thickness of 0.6 inches, a width of 0.1 inches at its narrow portion and a length of 0.8 inches. The dumbbells were tested on an Instron tester at 25°C. with a crosshead separation speed of 2 inches per minute. The tests indicated that the prepared block copolymer had an ultimate tensile strength of about 250 pounds per square inch at an elongation of 1,500 percent.

Analyses indicated that the block copolymer had a molecular weight of about 100,000. Thus, assuming that the terminal polystyrene blocks were of equal molecular weight, the block copolymer comprised terminal polystyrene blocks having molecular weights of about 9000 and internal polyisoprene having a molecular weight of about 82,000.

EXAMPLE III

Mixtures of various tackifying resins with a polystyrene-polyisoprene-polystyrene block copolymer, obtained as Kraton 107 from the The Shell Chemical Company, were prepared. The block copolymer was similar to the copolymer prepared according to Example II. It contained about 12 percent styrene by weight, a glass transition temperature of about −70°C. and a tensile strength of about 1,200 pounds per square inch with an elongation of about 1,300 percent measured at 25°C., according to the method used in Example II. The copolymer had an intrinsic viscosity of 1.1 as measured in toluene at 30°C.

The mixtures of tackifying resin and block copolymer were prepared by the following method:

One part of an amine type of non-staining antioxidant was dissolved in 300 parts of a hydrocarbon solvent at about 25°C. The hydrocarbon solvent consisted of 20 parts of toluene and 80 parts of hexane. This mixture of hydrocarbons was used for the solvent to provide an optimum viscosity for sample preparation. To the solvent mixture was added 100 parts of the block copolymer of polystyrene-polyisoprene-polystyrene and 100 parts of a tackifying resin. The mixture was agitated by rolling in a container at about 25°C. for about 8 to 12 hours.

The mixture was coated onto a polyester film having a 1 mil thickness (obtained as Mylar from The E I duPont deNemours & Company) with a doctor blade to provide a 1 mil coating on the polyester film. The coating was allowed to partially dry at about 25°C. for about 2 minutes. The polyester film with the coat thereon was then placed in a hot air oven having a temperature of 70°C. for about 5 minutes. The sample was removed from the hot air oven and allowed to cool to about 25°C. and, for protective purposes, a release paper was placed over the coating. The release paper was a clay coated sheet of paper with a silicone release agent overcoat. The sample was cut into strips one inch wide for testing purposes. The results of 180° peel strength and shear strength tests both on freshly prepared samples and on samples allowed to age at 70°C. for about 5 days are shown in the following table:

gram weight to the sample and measuring the time required for the tape to separate from the substrate. For the purposes of this example a time of about 5 days was used.

In Samples 1-3, 9 and 11-12, all of the samples exhibited peel strength to be suitable as a pressure sensitive adhesive. In Samples 4-8 none of the samples indicated a measurable peel strength.

In Samples 1-3 the shear strength test indicated no failure after about 5 days. In Sample 10 the shear strength test indicated a failure after 48 hours for the hot melt pressure sensitive adhesive. Such a shear strength for the adhesive is adequate and suitable for a pressure sensitive adhesive. In Samples 4-8 the shear strength indicated an almost immediate failure.

Table 1

| Sample No. | Tackifying Resin Origin | Iodine No. (1) | 180°Peel Strength (lbs) Fresh Sample | After Aging | Shear Strength Fresh Sample | After Aging |
|---|---|---|---|---|---|---|
| 1 | Aliphatic Hydrocarbons (2) | 70-110 | 3.5 | 4.0 | No Failure | No Failure |
| 2 | Aliphatic Hydrocarbons (3) | 145 | 3.7 | 3.3 | No Failure | No Failure |
| 3 | Aliphatic Hydrocarbons (4) | 44 | 2.5 | 1.5 | No Failure | No Failure |
| 4 | Styrenated Resin (5) | 92 | None | None | None | None |
| 5 | Styrene-Acrylonitrile (6) | | None | None | None | None |
| 6 | Aromatic Hydrocarbons (7) | | None | None | None | None |
| 7 | Styrene, Vinyl Toluene (8) | | None | None | None | None |
| 8 | Styrene (9) | | None | None | None | None |

(1) According to ASTM Method D-1959-61.
(2) Prepared according to the method of Example I.
(3) Obtained as Piccopale SF-100 from The Pennsylvania Industrial Chemicals Company.
(4) Obtained as Piccopale H-2, a hydrogenated resin, from The Pennsylvania Industrial Chemicals Company.
(5) Obtained as Nevex from The Neville Chemical Company.
(6) Obtained as Piccoflex 100 from The Pennsylvania Industrial Chemicals Company.
(7) Obtained as Picco 6100 from The Pennsylvania Industrial Chemicals Company.
(8) Obtained as Piccotex 100 from The Pennsylvania Industrial Chemicals Company.
(9) Obtained as Piccolastic A75 from The Pennsylvania Industrial Chemicals Company.

Samples 9-12 were prepared and tested according to the method used for Sample No. 1, except that various amounts of the aliphatic hydrocarbon resin obtained as Wing-Tack 95 were used with 100 parts of the block copolymer. In Sample 10, 20 parts of mineral oil were also added. The adhesive of Sample 10 was suitable as a hot melt pressure sensitive adhesive.

Table 2

| Sample No. | Resin Parts | 180° Peel Strength(lbs) | Shear Strength |
|---|---|---|---|
| 9 | 60 | 2.8 | No failure |
| 10 | 100 | 2.6 | 48 hours |
| 11 | 150 | 4.8 | No failure |
| 12 | 200 | 3.8 | No failure |

In this example the 180° peel strength tests were conducted according to Method PSTC-1, revised in April of 1966, of the Pressure Sensitive Tape Council. This method is found in the Fifth Edition of "TEST METHODS FOR PRESSURE SENSITIVE TAPES" developed by the Pressure Sensitive Tape Council, 1201 Waukegan Road, Glenview, Ill. This test measures the average pull value required to peel the adhesive from the substrate at at 180° angle in pounds per one inch width of the test sample. The sheer strength was measured in this example according to the method described at PST-7 of the Pressure Sensitive Tape Council. In particular, it was measured by applying a 1,000

As indicated, the adhesive composition of this specification can be suitable for preparing a hot melt pressure sensitive adhesive. When it is used as such an adhesive, generally up to about 30 percent by weight and more preferably from about 5 to about 20 percent by weight of an oil, such as a rubber processing oil, is mixed with the composition. Suitable processing oils are normally derived from petroleum, although they can also be derived from coal tar and other sources such as rosin oils. Representative processing oils are more fully described in U.S. Pat. No. 3,081,276. The processing oils are usually composed primarily of paraffinic hydrocarbons, naphthenic hydrocarbons and aromatic hydrocarbons. Such oils are well-known commercial oils normally used in rubber compounding which are generally high-boiling petroleum fractions obtained after gasoline, fuel oil and other lower boiling materials are removed by distillation. They normally have a viscosity of from about 10 centipoises at 100°C. up to semisolid materials softening at about 40° to about 90°C. They usually have a boiling point of from about 50°C. to at least about 200°C. and higher. For example, many processing oils have a boiling point of at least about 245°C. at 10 millimeters of mercury. They normally have a specific gravity (60/60°F.) of from about 0.9 to about 1.05.

As indicated, the adhesive composition has particular utility as a pressure sensitive adhesive. In this regard, commercially useful pressure sensitive tapes are provided comprising the adhesive composition adhered to a flexible substrate. Certainly, various conventional substrates, or backings for such tapes, can be used. Representative examples of such substrates are paper, cloth and various nonfibrous films such as cellophane, vinyl resins, polyethylene and the like. In the preparation of pressure sensitive adhesive tapes, the adhesive composition can be applied in various conventional manners such as from a solvent solution or dispersion using the hydrocarbon solvents indicated herein. Typical conventional methods of applying the adhesive composition include the use of a hot melt spreader, calendar, reverse roll coater, knife or doctor blade.

In the practice of this invention various amounts of the tackifying resin can be mixed with the copolymer to provide the adhesive composition, depending somewhat upon its intended use. For example, useful adhesive compositions are prepared by mixing from about 30 to about 250 percent by weight of the tackifying resin with the copolymer. More particularly, in pressure sensitive adhesive applications it is preferred that the tackifying resin comprises from about 30 to about 200 percent by weight of the copolymer; in hot melt adhesive applications it is preferred that the tackifying resin comprises from about 100 to about 250 weight percent of the copolymer and in laminating adhesive compositions it is usually preferred that the tackifying resin comprises from about 60 to about 150 weight percent of the copolymer. In the laminating adhesive applications it is usually desired that the adhesive composition contains at least up to about 40 percent by weight of the hydrocarbon solvents as hereinbefore described.

While certain representative embodiments and details have been shown for the purpose of illustrating the invention, it will be apparent to those skilled in this art that various changes and modifications may be made therein without departing from the spirit or scope of the invention.

What is claimed is:

1. An adhesive composition which comprises
   A. about 100 to about 250 parts by weight of a thermoplastic tackifying resin containing carbon-to-carbon unsaturation therein, comprising from about 20 to about 80 percent units derived from piperylene and correspondingly about 80 to about 20 percent units derived from 2-methyl-2-butene, having a softening point of about 80° to about 110°C, having an iodine number of from about 40 to about 140 according to ASTM D 1959-61, derived from polymerizing with aluminum chloride a mixture comprising piperylene and 2-methyl-2-butene in a mole ratio of about 20:75 to about 75:20, and having a maximum of about 5 weight percent of an aromatic component,
   B. about 5 to about 30 weight percent, based on said tackifying resin, of at least one oil primarily selected from petroleum-derived oils, coal tar-derived oils and rosin oils and
   C. 100 parts by weight of an unvulcanized elastomeric block copolymer of styrene and isoprene having an intrinsic viscosity of about 0.6 to about 1.5 as determined by 0.5 gram in 50 milliliters of toluene solution at 30°C and having the general configuration A - B - A wherein each A is an independently selected non-elastomeric styrene polymer block having an average molecular weight of about 5,000 to about 30,000 and a glass transition temperature above about 25°C, the total block A content being from about 10 to about 50 percent by weight of the copolymer, and B is an elastomeric 1,4-addition polymer block of isoprene having an average molecular weight from about 50,000 to about 150,000, a tensile strength at 25°C in excess of 200 pounds per square inch, and a glass transition temperature below about 10°C, the difference between the glass transition temperatures of the A and B blocks being at least 40°C.

2. The adhesive composition of claim 1 where said oil is selected from at least one of mineral oil and rubber processing oils characterized by having a viscosity ranging from a semi-solid to 10 centipoises at 100°C, a boiling point of from about 50° up to 245°C at 10 millimeters of mercury and a specific gravity (60/60°F) in the range of about 0.9 to about 1.05.

3. The adhesive composition of claim 2 where said oil is comprised of a mixture of paraffinic, naphthenic and aromatic hydrocarbons.

* * * * *